US012212077B2

(12) United States Patent
Pirch

(10) Patent No.: US 12,212,077 B2
(45) Date of Patent: Jan. 28, 2025

(54) METHOD FOR DETERMINING USER INTENT TO ACCESS A SECURE AREA

(71) Applicant: ASSA ABLOY AB, Stockholm (SE)

(72) Inventor: Hans-Juergen Pirch, Gratwein Strassengel (AT)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 18/597,264

(22) Filed: Mar. 6, 2024

(65) Prior Publication Data

US 2024/0213673 A1    Jun. 27, 2024

Related U.S. Application Data

(62) Division of application No. 17/753,923, filed as application No. PCT/EP2020/076428 on Sep. 22, 2020, now Pat. No. 11,955,723.

(Continued)

(51) Int. Cl.
*H01Q 5/25* (2015.01)
*G07C 9/28* (2020.01)

(52) U.S. Cl.
CPC ............... *H01Q 5/25* (2015.01); *G07C 9/28* (2020.01)

(58) Field of Classification Search
CPC ............ H01Q 5/25; H01Q 1/007; H01Q 1/42; H01Q 1/1221; H01Q 1/2216; H01Q 21/30;

(Continued)

(56) References Cited

U.S. PATENT DOCUMENTS 7,499,674 B2    3/2009 Salokannel et al.
7,597,250 B2   10/2009 Finn
(Continued)

FOREIGN PATENT DOCUMENTS

AU    2020356248    6/2023
CN    102602363    7/2012
(Continued)

OTHER PUBLICATIONS

"International Application Serial No. PCT EP2020 076428, International Search Report mailed Dec. 22, 2020", 5 pgs.
(Continued)

*Primary Examiner* — Nam V Nguyen
(74) *Attorney, Agent, or Firm* — Schwegman Lundberg & Woessner, P.A.

(57) ABSTRACT

The present disclosure relates to a reader, such as a reader for a physical access control system. The reader can include first and second antennas, each designed or configured for receiving ultra-wide band (UWB) signals. The reader can also include a mounting plane configured for mounting the reader to a surface. An axis aligning the first and second antennas can be arranged substantially perpendicular relative the mounting plane. A material can be provided between the first and second antennas. The material can have a thickness that defines a distance between the first and second antennas of less than a half wavelength of the UWB signal through air ($\lambda_A/2$), the material configured to slow down electromagnetic waves passing therethrough such that the thickness of the material provides an effective separation distance of the first and second antennas of at least a half wavelength of the UWB signal through air ($\lambda_A/2$).

18 Claims, 7 Drawing Sheets

Related U.S. Application Data

(60) Provisional application No. 62/906,342, filed on Sep. 26, 2019.

(58) Field of Classification Search
CPC ............ G07C 9/28; G07C 2009/00769; G07C 2209/63; G07C 9/00309; G06K 7/10356
USPC ........................................................ 340/5.64
See application file for complete search history.

(56) References Cited

U.S. PATENT DOCUMENTS

| | | |
|---|---|---|
| 7,756,002 B2 | 7/2010 | Batra et al. |
| 7,881,746 B2 | 2/2011 | Desai |
| 7,995,644 B2 | 8/2011 | Sahinoglu et al. |
| 8,355,671 B2 | 1/2013 | Kramer et al. |
| 8,478,360 B2 | 7/2013 | Soliman |
| 8,736,438 B1 | 5/2014 | Vasquez et al. |
| 8,913,599 B2 | 12/2014 | Gonikberg et al. |
| 9,007,173 B2 | 4/2015 | Mcintyre et al. |
| 9,408,147 B2 | 8/2016 | Polo et al. |
| 9,501,884 B2 | 11/2016 | Mcintyre et al. |
| 9,530,265 B2 | 12/2016 | Lee et al. |
| 9,666,005 B2 | 5/2017 | Ellis et al. |
| 9,721,404 B2 | 8/2017 | Muller |
| 9,769,627 B2 | 9/2017 | Siswick et al. |
| 9,942,849 B1 | 4/2018 | Hariharan et al. |
| 10,117,046 B2 | 10/2018 | Ledvina et al. |
| 10,171,129 B1 | 1/2019 | Hammerschmidt et al. |
| 10,181,230 B2 | 1/2019 | Esposito |
| 10,235,854 B2 | 3/2019 | Trani |
| 10,356,553 B2 | 7/2019 | Sant et al. |
| 10,469,987 B1 | 11/2019 | Kennedy |
| 10,486,646 B2 | 11/2019 | Ledvina et al. |
| 10,567,034 B2 | 2/2020 | Hammerschmidt et al. |
| 10,602,556 B2 | 3/2020 | Foster et al. |
| 10,652,925 B2 | 5/2020 | Naguib et al. |
| 10,660,037 B2 | 5/2020 | Hariharan et al. |
| 10,728,244 B2 | 7/2020 | Trani et al. |
| 10,759,389 B2 | 9/2020 | Ledvina et al. |
| 10,819,029 B2 | 10/2020 | Amiri et al. |
| 10,928,509 B2 | 2/2021 | Cristache |
| 11,100,734 B2 | 8/2021 | Ahn et al. |
| 11,301,651 B2 | 4/2022 | Studerus et al. |
| 11,955,723 B2 | 4/2024 | Pirch |
| 2003/0232620 A1 | 12/2003 | Runkle et al. |
| 2006/0273976 A1 | 12/2006 | Wang et al. |
| 2009/0027165 A1 | 1/2009 | Cristache |
| 2013/0214046 A1 | 8/2013 | Choi et al. |
| 2013/0237193 A1 | 9/2013 | Dumas et al. |
| 2013/0241694 A1 | 9/2013 | Sharma et al. |
| 2014/0225713 A1 | 8/2014 | Mcintyre et al. |
| 2014/0355582 A1 | 12/2014 | Kamath et al. |
| 2015/0310681 A1 | 10/2015 | Avery et al. |
| 2015/0332532 A1 | 11/2015 | Lee et al. |
| 2016/0055692 A1 | 2/2016 | Trani |
| 2016/0232388 A1 | 8/2016 | Van Zon |
| 2016/0234008 A1 | 8/2016 | Hekstra et al. |
| 2016/0241999 A1 | 8/2016 | Chin et al. |
| 2016/0278006 A1 | 9/2016 | Lee et al. |
| 2016/0316500 A1 | 10/2016 | Aliyar |
| 2016/0349352 A1 | 12/2016 | Karani et al. |
| 2016/0353233 A1 | 12/2016 | Yong et al. |
| 2016/0360341 A1 | 12/2016 | Srivatsa et al. |
| 2017/0070919 A1 | 3/2017 | Verger et al. |
| 2017/0151918 A1 | 6/2017 | Boesen |
| 2017/0153636 A1 | 6/2017 | Boesen |
| 2017/0158202 A1 | 6/2017 | Yang |
| 2017/0232930 A1 | 8/2017 | Murar et al. |
| 2017/0236346 A1 | 8/2017 | Murar et al. |
| 2018/0081025 A1 | 3/2018 | Jonsson et al. |
| 2018/0102583 A1 | 4/2018 | Trani |
| 2018/0162321 A1 | 6/2018 | Spiess |
| 2018/0162331 A1 | 6/2018 | Ayichew et al. |
| 2018/0213355 A1 | 7/2018 | Smith et al. |
| 2018/0234797 A1 | 8/2018 | Ledvina et al. |
| 2018/0252794 A1 | 9/2018 | Hermann |
| 2018/0292506 A1 | 10/2018 | Bjorkengren |
| 2019/0097317 A1 | 3/2019 | Di Nallo et al. |
| 2019/0098499 A1 | 3/2019 | Lerch et al. |
| 2019/0116619 A1 | 4/2019 | Hauck et al. |
| 2019/0292839 A1 | 9/2019 | Kim et al. |
| 2019/0297454 A1 | 9/2019 | Smith et al. |
| 2020/0005566 A1 | 1/2020 | Jain et al. |
| 2020/0053689 A1 | 2/2020 | Mcqueen et al. |
| 2020/0150261 A1 | 5/2020 | Naguib et al. |
| 2020/0259522 A1 | 8/2020 | Hammerschmidt et al. |
| 2020/0320188 A1 | 10/2020 | Graff et al. |
| 2020/0351781 A1 | 11/2020 | Hariharan et al. |
| 2021/0304535 A1* | 9/2021 | Studerus ............ G07C 9/00309 |
| 2022/0153229 A1 | 5/2022 | Brückner |
| 2022/0384949 A1 | 12/2022 | Pirch |
| 2023/0343156 A1 | 10/2023 | Einberg et al. |

FOREIGN PATENT DOCUMENTS

| | | |
|---|---|---|
| CN | 202703516 | 1/2013 |
| CN | 105931326 | 9/2016 |
| CN | 106226731 | 12/2016 |
| CN | 107428313 | 12/2017 |
| CN | 114600314 | 6/2022 |
| CN | 109637065 | 10/2022 |
| DE | 10105191 | 9/2002 |
| DE | 102018102405 | 8/2019 |
| EP | 3072754 | 9/2016 |
| EP | 3073284 | 9/2016 |
| EP | 2617242 | 10/2016 |
| EP | 3101874 | 12/2016 |
| EP | 3147868 | 3/2017 |
| EP | 3349192 | 7/2018 |
| IN | 202217016296 | 7/2022 |
| JP | 2010276531 | 12/2010 |
| JP | 6205237 | 9/2017 |
| JP | 2019014309 | 1/2019 |
| JP | 2022549891 | 11/2022 |
| JP | 2023169173 | 11/2023 |
| JP | 7411789 | 12/2023 |
| KR | 101077406 | 10/2011 |
| KR | 101632944 | 7/2016 |
| KR | 20170040240 | 4/2017 |
| KR | 102659976 | 4/2024 |
| WO | 2005114593 | 12/2005 |
| WO | 2013178163 | 12/2013 |
| WO | 2016007627 | 1/2016 |
| WO | 2016059451 | 4/2016 |
| WO | 2016198640 | 12/2016 |
| WO | 2017136725 | 8/2017 |
| WO | 2017144345 | 8/2017 |
| WO | 2021058479 | 4/2021 |
| WO | 2021069468 | 4/2021 |

OTHER PUBLICATIONS

"International Application Serial No. PCT EP2020 076428, Written Opinion mailed Dec. 22, 2020", 7 pgs.
"U.S. Appl. No. 17/753,923, Preliminary Amendment Filed Mar. 18, 2022", 7 pgs.
"International Application Serial No. PCT EP2020 076428, International Preliminary Report on Patentability mailed Apr. 7, 2022", 9 pgs.
"Mexican Application Serial No. MX a 2022 003588, Office Action mailed Apr. 8, 2022", with machine English translation, 9 pages.
"Australian Application Serial No. 2020356248, Voluntary Amendment filed May 9, 2022", 10 pgs.
"Mexican Application Serial No. MX a 2022 003588, Response Filed Jun. 17, 2022 to Office Action mailed Apr. 8, 2022", with English translation, 5 pages.
"European Application Serial No. 20776148.7, Response Filed Sep. 28, 2022 to Communication Pursuant to Rules 161(1) and 162 EPC mailed Apr. 8, 2022", 13 pgs.
"Indian Application Serial No. 202217016296, First Examination Report mailed Oct. 18, 2022", with English translation, 6 pages.

(56) References Cited

OTHER PUBLICATIONS

"Australian Application Serial No. 2020356248, First Examination Report mailed Dec. 8, 2022", 3 pgs.
"Australian Application Serial No. 2020356248, Response Filed Feb. 14, 2023 to First Examination Report mailed Dec. 8, 2022", 10 pgs.
"Korean Application Serial No. 10-2022-7009811, Notice of Preliminary Rejection mailed Apr. 4, 2023", with English translation, 12 pages.
"Indian Application Serial No. 202217016296, Response Filed Apr. 18, 2023, to First Examination Report mailed Oct. 18, 2022", with English claims, 21 pages.
"Canadian Application Serial No. 3152337, Examiners Rule 86(2) Report mailed May 9, 2023", 5 pgs.
"U.S. Appl. No. 17/753,923, Restriction Requirement mailed May 18, 2023", 5 pgs.
"Japanese Application Serial No. 2022-519278, Notification of Reasons for Rejection mailed May 30, 2023", with English translation, 4 pages.
"International Application Serial No. PCT EP2020 078051, International Search Report mailed Dec. 21, 2020", 5 pgs.
"International Application Serial No. PCT EP2020 078051, Written Opinion mailed Dec. 21, 2020", 6 pgs.
"International Application Serial No. PCT EP2020 078051, International Preliminary Report on Patentability mailed Feb. 3, 2022", 6 pgs.
"U.S. Appl. No. 17/753,923, Response filed Jun. 6, 2023 to Restriction Requirement mailed May 18, 2023", 6 pgs.
"Korean Application Serial No. 10-2022-7009811, Response Filed Jun. 1, 2023 to Notice of Preliminary Rejection mailed Apr. 4, 2023", with English claims, 21 pages.
"U.S. Appl. No. 17/766,961, Preliminary Amendment filed Apr. 6, 2022", 6 pgs.
"The Basics of Signal Attenuation", CAS Dataloggers, [Online] Retrieved from the internet:www.dataloggerinc.corn resource-articte basics-signal-attenuation, (Nov. 14, 2016), 9 pages.
"Sweden Application Serial No. 1951143-5, Office Action mailed Sep. 15, 2020", 11 pages.
"Sweden Application Serial No. 1951143-5, Office Action mailed Apr. 15, 2021", 4 pages.
"U.S. Appl. No. 17/753,923, Non Final Office Action mailed Aug. 16, 2023", 21 pgs.
"190756CN_230729_1st Office Action with search report", with English translation, (Jul. 29, 2023), 23 pages.
"Japanese Application Serial No. 2022-519278, Response Filed Aug. 25, 2023 to Notification of Reasons for Rejection mailed May 30, 2023", with English claims, 10 pages.
"Canadian Application Serial No. 3152337, Response filed Sep. 6, 2023 to Examiners Rule 86(2) Report mailed May 9, 2023", with English claims, 8 pages.
"Japanese Application Serial No. 2023-137333, Voluntary Amendment filed Sep. 13, 2023", with English claims, 40 pages.
"Korean Application Serial No. 10-2022-7009811, Final Office Action mailed Sep. 22, 2023", with English translation, 15 pages.
"U.S. Appl. No. 17/753,923, Response filed Nov. 10, 2023 to Non Final Office Action mailed Aug. 16, 2023", 10 pgs.
"U.S. Appl. No. 17/766,961, Non Final Office Action mailed Nov. 14, 2023", 6 pgs.
"U.S. Appl. No. 17/753,923, Notice of Allowance mailed Dec. 8, 2023", 9 pgs.
"U.S. Appl. No. 17/753,923, Supplemental Notice of Allowability mailed Dec. 14, 2023", 3 pgs.
"U.S. Appl. No. 17/766,961, Response filed Dec. 20, 2023 to Non Final Office Action mailed Nov. 14, 2023", 6 pgs.
"Korean Application Serial No. 10-2023-7018601, Notice of Preliminary Rejection mailed Dec. 12, 2023", with English translation, 11 pages.
"U.S. Appl. No. 17/766,961, Notice of Allowance mailed Jan. 18, 2024", 5 pgs.
"Korean Application Serial No. 10-2022-7009811, Response Filed Jan. 19, 2024 to Final Office Action mailed Sep. 22, 2023", with English claims, 16 pages.
"U.S. Appl. No. 17/753,923, Supplemental Notice of Allowability mailed Feb. 20, 2024", 3 pgs.
"CN Application No. 202080070399.4 Decision of Rejection mailed Jan. 28, 2024", with English translation, 20 pages.
Okeef, Brian, "Finding Location with Time of Arrival and Time Difference of Arrival Techniques", ECE Senior Capstone Project Tech Notes, [Online] Retrieved from the internet:sites.tufts.edu eeseniordesignhandbookfilesi2017i05 Fire8rick_Okeefe_F1.pdf, (2017), 3 pgs.
"Australian Application Serial No. 2023203743, First Examination Report mailed May 21, 2024", 2 pgs.
"Japanese Application Serial No. 2023-137333, Notification of Reasons for Refusal mailed May 28, 2024", with English translation, 16 pages.
"Australian Application Serial No. 2023203743, Response Filed Jun. 20, 2024 to First Examination Report mailed May 21, 2024", 89 pgs.
"Mexican Application Serial No. MX a 2022 003588, Voluntary Amendment Filed Feb. 12, 2024", with English claims, 16 pages.
"Korean Application Serial No. 10-2023-7018601, Notice of Preliminary Rejection mailed Aug. 2, 2024", with English translation, 10 pages.
Wong, Kin-Lu, "Ultrawide-band square planar metal-plate monopole antenna with a tridentshaped feeding strip", IEEE Transactions on Antennas and Propagation, vol. 53 No. 4, [Online]. Retrieved from the Internet: http:zVdoi.org 10.1109 TAP.2005.844430, (2005), pp. 1262-1269.
"U.S. Appl. No. 17/753,923, Supplemental Notice of Allowability mailed Mar. 13, 2024", 3 pages.
"Korean Application Serial No. 10-2023-7018601, Response Filed per Agent Letter Notice of Preliminary Rejection mailed Dec. 12, 2023", with English translation, 9 pages.
"Japanese Application Serial No. 2023-137333, Response filed Oct. 18, 2024 to Notification of Reasons for Refusal mailed May 28, 2024", W English Claims, 9 pgs.
"Korean Application Serial No. 10-2023-7018601, Response filed Oct. 2, 2024 to Notice of Preliminary Rejection mailed Aug. 2, 2024", W English Claims, 20 pgs.

\* cited by examiner

METHOD FOR DETERMINING USER INTENT TO ACCESS A SECURE AREA

PRIORITY APPLICATION

This application is a divisional of U.S. application Ser. No. 17/753,923, titled "Ultra-Wide Band Antenna Configuration for Physical Access Control System," filed Mar. 18, 2022, which is a national stage application under 35 U.S.C. § 371 of PCT Appl. No. PCT/EP2020/076428, titled "Ultra-Wide Band Antenna Configuration for Physical Access Control System," filed Sep. 22, 2020, which claims priority to U.S. Provisional Appl. No. 62/906,342, titled "Ultra-Wide Band Antenna Configuration for Physical Access Control System," filed Sep. 26, 2019, each of which is incorporated by reference herein in its entirety.

TECHNICAL FIELD

Embodiments described herein generally relate to antenna configurations and more specifically to ultra-wide band antenna configurations for physical access control systems.

BACKGROUND

Ultra-wide band (UWB) is a radio frequency (RF) technique that uses short, low power, pulses over a wide frequency spectrum. The pulses are on the order of millions of individual pulses per second. The width of the frequency spectrum is generally greater than 500 megahertz or greater than twenty percent of an arithmetic center frequency.

UWB can be used for communication, such as by encoding data via time modulation (e.g., pulse-position encoding). Here, symbols are specified by pulses on a subset of time units out of a set of available time units. Other examples of UWB encodings can include amplitude modulation and/or polarity modulation. The wide band transmission tends to be more robust to multipath fading than carrier-based transmission techniques. Further, the lower power of pulses at any given frequency tend to reduce interference with carrier-based communication techniques.

UWB can be used in radar operations, providing localization accuracies on the scale of tens of centimeters. Due to the possibly variable absorption and reflection of different frequencies in a pulse, both surface and obstructed (e.g., covered) features of an object can be detected. In some cases, the localization provides an angle of incidence in addition to distance.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments nor delineate the scope of any or all embodiments.

Physical access control covers a range of systems and methods to govern access, for example by people, to secure areas or secure assets. Physical access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. Physical access control systems (PACS) can include a reader (e.g., an online or offline reader) that holds authorization data and can be capable of determining whether credentials (e.g., from credential or key devices such as radio frequency identification (RFID) chips in cards, fobs, or personal electronic devices such as mobile phones) are authorized for an actuator or control mechanism (e.g., door lock, door opener, software control mechanism, turning off an alarm, etc.), or PACS can include a host server to which readers and actuators are connected (e.g., via a controller) in a centrally managed configuration. In centrally managed configurations, readers can obtain credentials from credential or key devices and pass those credentials to the PACS host server. The host server then determines whether the credentials authorize access to the secure area or secure asset and commands the actuator or other control mechanism accordingly.

The present disclosure, in one or more embodiments, relates to a reader, such as a reader for a PACS. The reader can include a first antenna and second antenna, each designed or configured for receiving UWB signals. The reader can also include or define a mounting plane configured for mounting the reader to a surface, such as a wall (or other boundary that can define a secured area). An axis aligning the first and second antennas (e.g., an antenna axis) can be arranged generally out of plane (e.g., at non-zero or non-parallel angles) relative the mounting plane. In some cases, the antenna axis can be arranged substantially perpendicular relative the mounting plane. In some aspects, a material can be provided between the first and second antennas. The material can have a thickness that defines a distance between the first and second antennas of less than a half wavelength of the UWB signal through air ($\lambda_A/2$), the material configured to slow down electromagnetic waves passing therethrough such that the thickness of the material provides an effective separation distance of the first and second antennas of at least a half wavelength of the UWB signal through air ($\lambda_A/2$).

The present disclosure, in one or more embodiments, additionally relates to a reader, such as a reader for a PACS. The reader can include a first antenna and a second antenna, each designed or configured for receiving UWB signals. An axis aligning the first and second antennas (e.g., an antenna axis) can be arranged generally out of plane (e.g., at non-zero or non-parallel angles) relative a surface to which the reader is to be mounted. In some cases, the antenna axis can be arranged substantially perpendicular to a surface to which the reader is to be mounted. Again, in some aspects, a material can be provided between the first and second antennas. The material can have a thickness that defines a distance between the first and second antennas of less than a half wavelength of the UWB signal through air ($\lambda_A/2$), the material configured to slow down electromagnetic waves passing therethrough such that the thickness of the material provides a functional separation distance of the first and second antennas of at least a half wavelength of the UWB signal through air ($\lambda_A/2$).

The present disclosure, in one or more embodiments, also relates to an UWB antenna configuration. The UWB antenna configuration can include a first antenna and a second antenna designed or configured for receiving UWB signals and a material between the first and second antennas having a thickness that defines a distance between the first and second antennas of less than a half wavelength of the UWB signal through air ($\lambda_A/2$), the material configured to slow down electromagnetic waves passing therethrough such that the thickness of the material provides an effective separation distance of the first and second antennas of at least a half wavelength of the UWB signal through air ($\lambda_A/2$).

The present disclosure, in one or more embodiments, relates still further to a method for determining user intent to access a secure area secured by a secure access point. The method can include receiving a UWB signal from a credential device at each of a first and second UWB antenna, determining localization data relating to the credential device based on the UWB signal, based on the time of receipt of the UWB signal at each of the first and second UWB antennas, determining whether the credential device is outside or inside the secure area, and based on the localization data and the determination of whether the credential device is outside or inside the secure area, determining whether it appears the user is exhibiting an intent to access the secure area. The method can further include receiving credential information from the credential device, validating the credential information, and if the credential information is valid and it has been determined that the user is exhibiting an intent to access the secure area, permitting access to the secure area by the user of the credential device. In some cases, the step of validating the credential information is completed after it has been determined that the user is exhibiting an intent to access the secure area. In some cases, the step of validating the credential information is completed prior to or simultaneous with determining that the user is exhibiting an intent to access the secure area.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the scope of the present disclosure. Accordingly, the drawings and detailed description are to be regarded as illustrative in nature and not restrictive.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
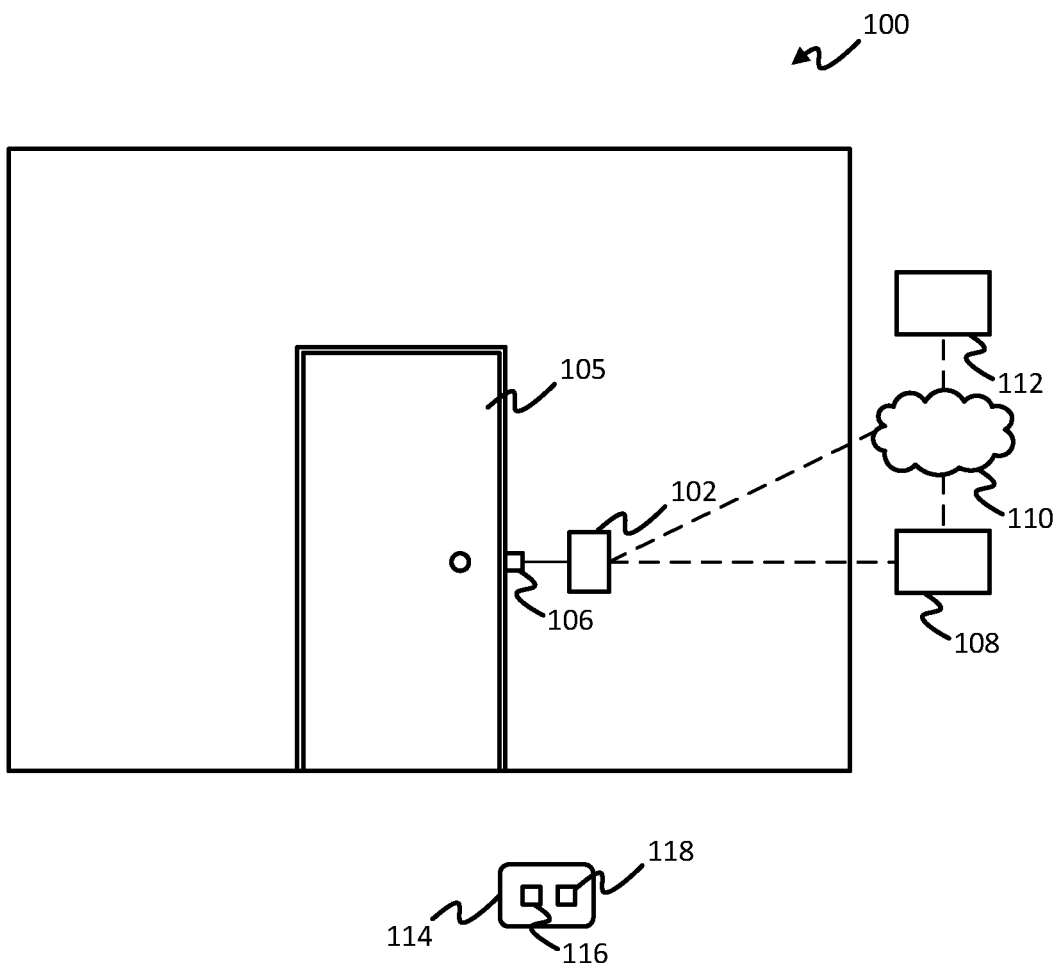
FIG. 1 illustrates a front view of an example PACS, or portions thereof.

The present disclosure generally relates to antenna configurations, and more specifically to UWB antenna configurations for physical access control systems. The present disclosure further generally relates to UWB antenna configurations for determining location of a credential, and more specifically to determining which side of an access point, such as a door, gate, turnstile, etc. the credential is located, which may assist in understanding or determining a user's intent to access a secure area. The present disclosure also generally relates to methods for determining a user's intent to access a secure area, for example, using devices having such UWB antenna configurations.

As indicated above, in general, physical access control covers a range of systems and methods to govern access, for example by people, to secure areas or secure assets. Physical access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. Physical access control systems (PACS) can generally include a reader (e.g., an online or offline reader) that holds authorization data and can be capable of determining whether credentials (e.g., from credential or key devices such as radio frequency identification (RFID) chips in cards, fobs, magnetic stripe cards, or personal electronic devices such as mobile phones) are authorized for an actuator or control mechanism (e.g., door lock, door opener, software control mechanism, turning off an alarm, etc.). Alternatively, PACS can include a host server to which readers and actuators are connected (e.g., via a controller) in a centrally managed configuration. In centrally managed configurations, readers can obtain credentials from credential or key devices and pass those credentials to the PACS host server. The host server can then determine whether the credentials authorize access to the secure area or secure asset and command the actuator or other control mechanism accordingly or can command the reader to operate the actuator or other control mechanism accordingly.

Wireless PACS, e.g., those that utilize wireless communication between the reader and the credential or key device, can use RFID or personal area network (PAN) technologies, such as the IEEE 802.15.1, Bluetooth, Bluetooth Low Energy (BLE), near field communications (NFC), ZigBee, GSM, CDMA, Wi-Fi, etc. Many of these technologies have a few drawbacks for a seamless user experience. For example, the range of NFC is so short that credential exchange typically does not happen until the user is very near the secure area or asset and attempts to gain access. The credential transfer to the reader and response by the reader or host server can take several seconds, resulting in a frustrating user experience. Further, the user generally must remove the device from a pocket, for example, and place it on or very near the reader for the process to begin.

On the other hand, BLE devices have a range of tens of meters (e.g., ten to twenty meters). Thus, credential exchange can be accomplished as the user approaches the reader. BLE, as well as many other PAN standards, however, do not offer accurate physical tracking of devices (e.g., ranging, positioning, etc.). Thus, it can be difficult for the reader to determine whether the user actually intends to gain access to the secure area or asset without some additional evidence of intent. It is problematic, for example, if an authorized user merely passed by the reader in a hall and the door was unlocked, or even opened. Evidence of intent can include such things as touching a door handle, gesturing with the key-device, etc. This, however, can be a less than ideal user experience when compared with a user simply walking up to the reader and gaining access to the secured area without further action or interaction on the part of the user.

To help address one or more of these or other issues, localization techniques (e.g., using secure UWB ranging) can be used and can be combined with PAN discovery and key exchange. Localization techniques of UWB can be more accurate than some conventional techniques and can, for example, be accurate to the tens of centimeters. UWB localization techniques may provide both range and direction of the credential or key device with respect to the reader. This accuracy far surpasses the roughly ten-meter accuracy of, for example, BLE when readers are not coordinated. The precision of UWB accuracy can be a useful tool in seamlessly determining user intent (e.g., whether the user is attempting to access the secure area or asset, or is simply passing by). For example, several zones can be defined, such as near the reader, at the reader, etc., to provide different contexts for understanding user intent. Additionally or alternatively, the accuracy of the tracking helps to provide an accurate model of user motion or the direction of movement of the user from which intent can be discerned. Thus, the reader can categorize user motion as, for example, likely approaching the reader or simply walking past.

Once the intent trigger occurs, the reader may act on the credentials exchanged, for example, via a PAN technology. For an offline reader, e.g., a reader not connected to a control panel or host server, the reader may directly control the actuator or other control mechanism (e.g., a lock on a disconnected door). In a centrally managed PACS, an (online) reader may forward the credentials to a control panel or host server to act upon.

Figure 2:
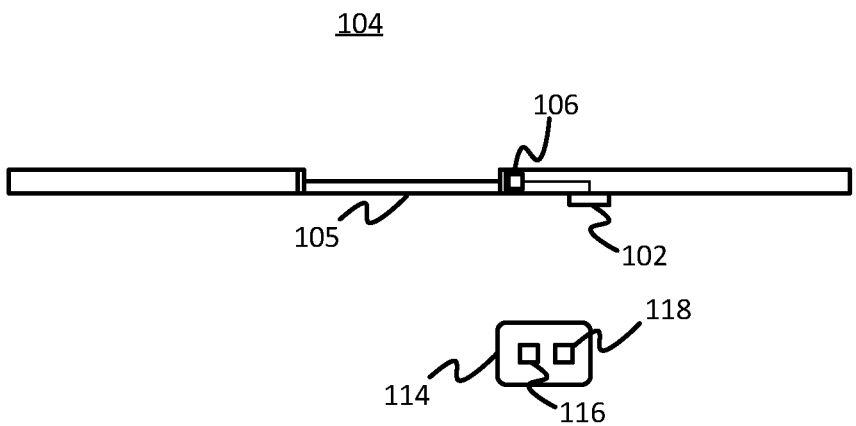
FIG. 2 illustrates a top cross-sectional view of an example PACS, or portions thereof.

FIGS. 1 and 2 illustrate an example PACS 100, or portions thereof. PACS system 100 can include a reader device, or simply reader, 102 associated with a secure area, access point, or other asset 104. In some cases, such as in the example illustrated in FIG. 1, secure asset 104 is a secure area secured by an access point 105, such as a door, gate, turnstile or the like controlling or permitting authorized access to the secure area. Reader 102 can include or be operably connected with a control mechanism 106, such as a locking mechanism, that controls whether access to access point 105 is permitted (e.g., can be opened or accessed) or may even control opening and/or closing of the access point. Reader 102 can be an offline reader, e.g., a reader not connected to a control panel or host server, and in such cases may make its own access control determinations and directly operate or command control mechanism 106, accordingly. Reader 102 can be a wireless reader device, in that the reader may communicate with credential or key devices via wireless technologies, such as RFID or PAN technologies, such as the IEEE 802.15.1, Bluetooth, Bluetooth Low Energy (BLE), near field communications (NFC), ZigBee, GSM, CDMA, Wi-Fi, etc.

In some cases, reader 102 can be connected by wire or wirelessly to a control panel 108. In such cases, reader 102 may transmit credential information to control panel 108, and the control panel may make, or may share responsibilities with the reader in making, access control determinations. Based on the access control determinations, control panel 108 can instruct reader 102 to operate or command control mechanism 106, accordingly. Alternately, control panel 108 can be connected directly or wirelessly to control mechanism 106, and in such cases may directly operate or command the control mechanism, accordingly, bypassing reader 102.

In some cases, reader 102 and control panel 108, and even control mechanism 106, can be connected to a wired or wireless network 110 and communicate with each other, as described above, via the network. Example networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. If PACS 100 is managed by a remote system, the PACS can include a host server 112 connected by wire or wirelessly to network 110 and that may communicate with reader 102 and/or control panel 108. In such cases, reader 102 can transmit credential information to host server 112 via network 110 or can transmit credential information to control panel 108, which can then transmit the credential information to the host server via the network. Host server 112 may make, or may share responsibilities with reader 102 and/or control panel 108 in making, access control determinations. Based on the access control determinations, host server 112 can instruct reader 102, directly or indirectly via control panel 108, to operate or command control mechanism 106, accordingly. Alternately, host server 112 can instruct control panel 108 to operate or command control mechanism 106, accordingly. In still another example, host server 112 can be connected via network 110 to control mechanism 106 and directly operate or command the control mechanism, accordingly, bypassing reader 102 and control panel 108.

Figure 3:
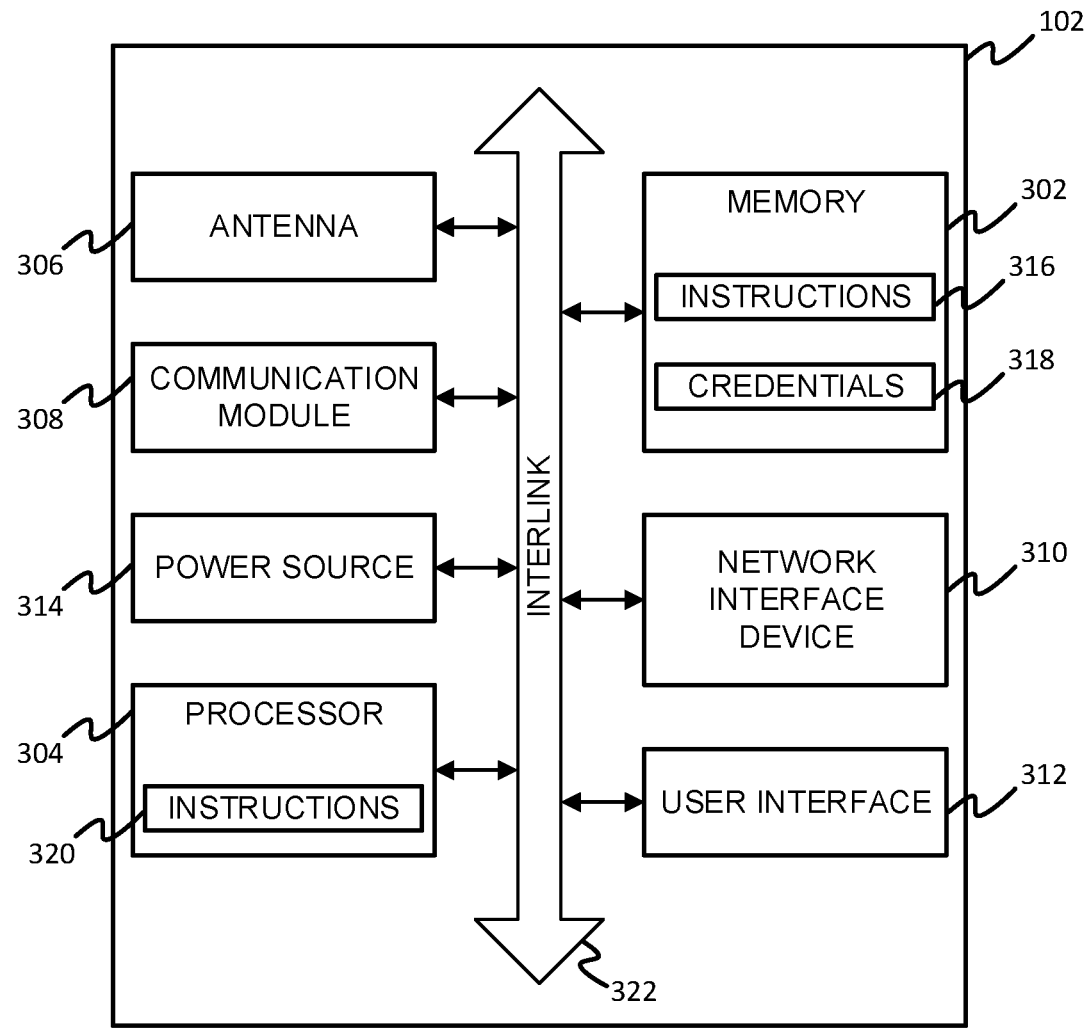
FIG. 3 illustrates a block diagram schematic of various components of an example PACS reader.

FIG. 3 illustrates a block diagram schematic of various components of an example reader 102. In general, reader 102 can include one or more of a memory 302, a processor 304, one or more antennas 306, a communication module 308, a network interface device 310, a user interface 312, and a power source or supply 314.

Memory 302 can be used in connection with the execution of application programming or instructions by processor 304, and for the temporary or long-term storage of program instructions or instruction sets 316 and/or credential or authorization data 318, such as credential data, credential authorization data, or access control data or instructions. For example, memory 302 can contain executable instructions 316 that are used by the processor 304 to run other components of reader 102 and/or to make access determinations based on credential or authorization data 318. Memory 302 can comprise a computer readable medium that can be any medium that can contain, store, communicate, or transport data, program code, or instructions for use by or in connection with reader 102. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Processor 304 can correspond to one or more computer processing devices or resources. For instance, processor 304 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 304 can be provided as a microprocessor, Central Processing Unit (CPU), or plurality of microprocessors or CPUs that are configured to execute instructions sets stored in an internal memory 320 and/or memory 302.

Antenna 306 can correspond to one or multiple antennas and can be configured to provide for wireless communications between reader 102 and a credential or key device. Antenna(s) 306 can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, antenna(s) 306 can be RF antenna(s), and as such, may transmit/receive RF signals through free-space to be received/transferred by a credential or key device having an RF transceiver. In some cases, at least one antenna 306 is an antenna designed or configured for transmitting and/or receiving UWB signals (referred to herein for simplicity as a "UWB antenna") such that the reader can communicate using UWB techniques.

Communication module 308 can be configured to communicate according to any suitable communications protocol with one or more different systems or devices either remote or local to reader 102, such as one or more control mechanisms 106 or control panel 108.

Network interface device 310 includes hardware to facilitate communications with other devices, such as control panel 108 or host server 112, over a communication network, such as network 110, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 310 can include an Ethernet port or other physical jack, a Wi-Fi card, a Network Interface Card (NIC), a cellular interface (e.g., antenna, filters, and associated circuitry), or the like. In some examples, network interface device 310 can include a plurality of antennas to wirelessly communicate using at least one of single-input multiple-output (SIMO), multiple-input multiple-output (MIMO), or multiple-input single-output (MISO) techniques.

User interface 312 can include one or more input devices and/or display devices. Examples of suitable user input devices that can be included in user interface 312 include, without limitation, one or more buttons, a keyboard, a mouse, a touch-sensitive surface, a stylus, a camera, a microphone, etc. Examples of suitable user output devices that can be included in user interface 312 include, without limitation, one or more LEDs, a LCD panel, a display screen, a touchscreen, one or more lights, a speaker, etc. It should be appreciated that user interface 312 can also include a combined user input and user output device, such as a touch-sensitive display or the like.

Power source 314 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the reader 102. Power source 314 can also include some implementation of surge protection circuitry to protect the components of reader 102 from power surges.

Reader 102 can also include one or more interlinks or buses 322 operable to transmit communications between the various hardware components of the reader. A system bus 322 can be any of several types of commercially available bus structures or bus architectures.

Figure 4:
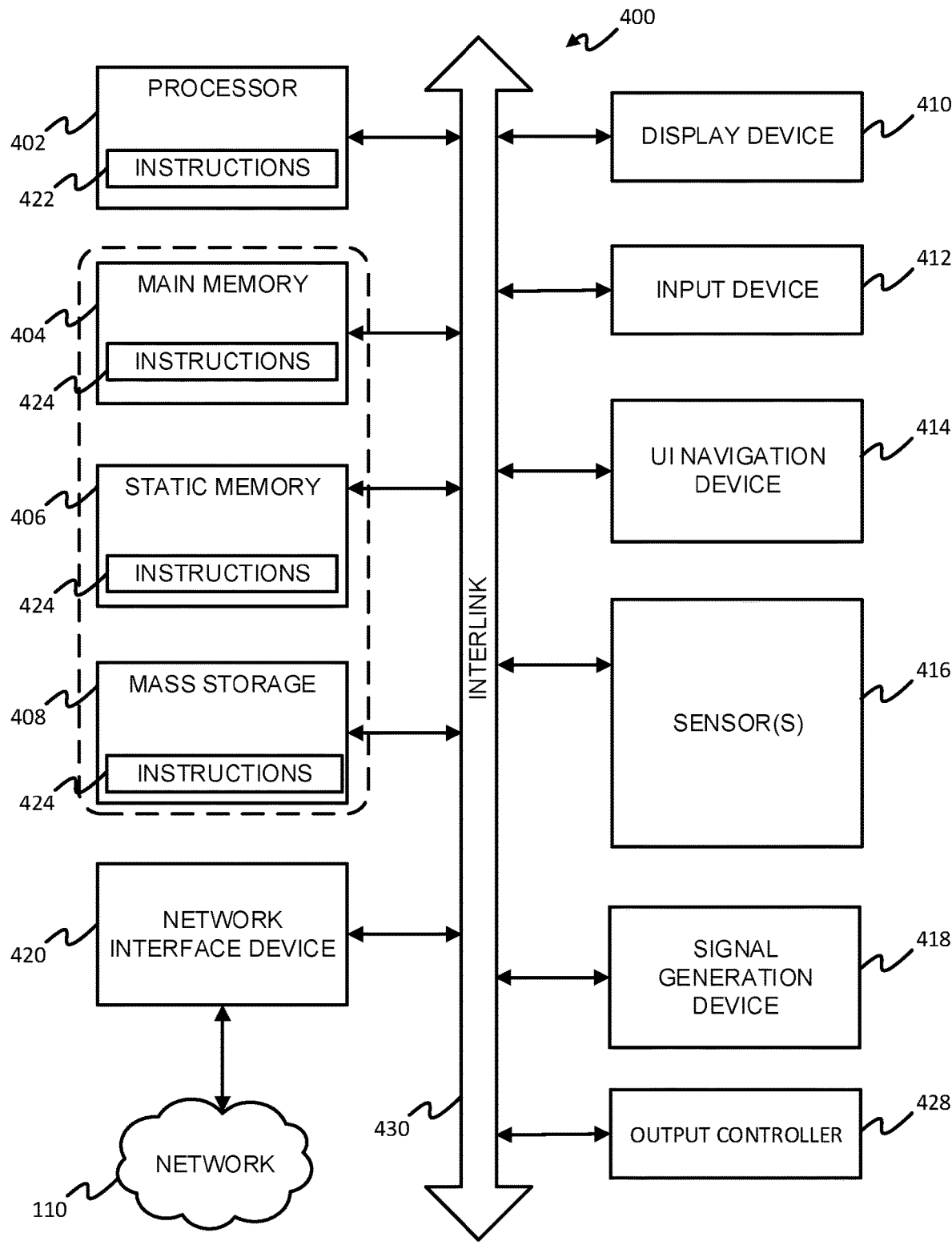
FIG. 4 illustrates a block diagram schematic of various example components of an example machine that may be used as, for example, a PACS control panel or PACS host server.

FIG. 4 illustrates a block diagram schematic of various example components of an example machine 400 that can be used as, for example, control panel 108 and/or host server 112. Examples, as described herein, can include, or can operate by, logic or a number of components, or mechanisms in machine 400. Generally, circuitry (e.g., processing circuitry) is a collection of circuits implemented in tangible entities of machine 400 that include hardware (e.g., simple circuits, gates, logic, etc.). Circuitry membership can be flexible over time. Circuitries include members that can, alone or in combination, perform specified operations when operating. In some examples, hardware of the circuitry can be immutably designed to carry out a specific operation (e.g., hardwired). In some examples, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions permit embedded hardware (e.g., the execution units or a loading mechanism) to create members of the circuitry in hardware via the variable connections to carry out portions of the specific operation when in operation. Accordingly, in some examples, the machine readable medium elements are part of the circuitry or are communicatively coupled to the other components of the circuitry when the device is operating. In some examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional and/or more specific examples of components with respect to machine 400 follow.

In some embodiments, machine 400 can operate as a standalone device or can be connected (e.g., networked) to other machines. In a networked deployment, machine 400 can operate in the capacity of a server machine, a client machine, or both in server-client network environments. In some examples, machine 400 can act as a peer machine in a peer-to-peer (P2P) (or other distributed) network environment. Machine 400 can be or include a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 400 can include a hardware processor 402 (e.g., a central processing unit (CPU), a graphics processing unit (GPU), a hardware processor core, or any combination thereof) and a main memory 404, a static memory (e.g., memory or storage for firmware, microcode, a basic-input-output (BIOS), unified extensible firmware interface (UEFI), etc.) 406, and/or mass storage 408 (e.g., hard drives, tape drives, flash storage, or other block devices) some or all of which can communicate with each other via an interlink (e.g., bus) 430. Machine 400 can further include a display device 410 and an input device 412 and/or a user interface (UI) navigation device 414. Example input devices and UI navigation devices include, without limitation, one or more buttons, a keyboard, a touch-sensitive surface, a stylus, a camera, a microphone, etc.). In some examples, one or more of the display device 410, input device 412, and UI navigation device 414 can be a combined unit, such as a touch screen display. Machine 400 can additionally include a signal generation device 418 (e.g., a speaker), a network interface device 420, and one or more sensors 416, such as a global positioning system (GPS) sensor, compass, accelerometer, or other sensor. Machine 400 can include an output controller 428, such as a serial (e.g., universal serial bus (USB), parallel, or other wired or wireless (e.g., infrared (IR), NFC, etc.) connection to communicate or control one or more peripheral devices (e.g., a printer, card reader, etc.).

Processor 402 can correspond to one or more computer processing devices or resources. For instance, processor 402 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 402 can be provided as a microprocessor, Central Processing Unit (CPU), or plurality of microprocessors or CPUs that are configured to execute instructions sets stored in an internal memory 422 and/or memory 404, 406, 408.

Any of memory 404, 406, and 408 can be used in connection with the execution of application programming or instructions by processor 402, and for the temporary or long-term storage of program instructions or instruction sets 424 and/or other data. Any of memory 404, 406, 408 can comprise a computer readable medium that can be any medium that can contain, store, communicate, or transport data, program code, or instructions 424 for use by or in connection with machine 400. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), a solid-state storage device, in general, a compact disc read-only memory (CD-ROM), or other optical or magnetic storage device. As noted above, computer-readable media includes, but is not to be confused with, computer-readable storage medium, which is intended to cover all physical, non-transitory, or similar embodiments of computer-readable media.

Network interface device 420 includes hardware to facilitate communications with other devices over a communication network, such as network 110, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax, IEEE 802.15.4 family of standards, and peer-to-peer (P2P) networks, among others. In some examples, network interface device 420 can include an Ethernet port or other physical jack, a Wi-Fi card, a Network Interface Card (NIC), a cellular interface (e.g., antenna, filters, and associated circuitry), or the like. In some examples, network interface device 420 can include a plurality of antennas to wirelessly communicate using at least one of single-input multiple-output (SIMO), multiple-input multiple-output (MIMO), or multiple-input single-output (MISO) techniques.

As indicated above, machine 400 can include one or more interlinks or buses 430 operable to transmit communications between the various hardware components of the machine. A system bus 322 can be any of several types of commercially available bus structures or bus architectures.

With reference back to FIGS. 1 and 2, in use, as a user having a credential or key device 114 approaches reader 102 associated with access point 105, the credential device 114 may communicate a user credential or credential data to the reader, for example, via a suitable RFID or PAN technology. In general, a credential device is a device that carries evidence of authority, status, rights, and/or entitlement to privileges for a holder of the credential device. A credential device can be a portable device having memory 116, storing one or more user credentials or credential data, and a reader interface (i.e., an antenna and Integrated Circuit (IC) chip) 118, which permits the credential to exchange data with a reader device, such as reader 102, via a credential interface of the reader device, such as antenna 306. One example of credential device 114 is an RFID smartcard that has data stored thereon allowing a holder of the credential device to access a secure area or asset protected by reader 102, such as secure area 104. Other examples of credential devices include, but are not limited to, proximity RFID-based cards, access control cards, credit cards, debit cards, passports, identification cards, key fobs, NFC-enabled devices, mobile phones, personal digital assistants (PDAs), tags, or any other device configurable to emulate a virtual credential.

If reader 102, control panel 108, and/or host server 112 determine that the user credential or credential data provided by credential device 114 is valid and/or authorized, reader 102, control panel 108, or host server 112 may operate control mechanism 106 to allow access to the secure area 104 by the user having the credential device. In some cases, control mechanism 106 may even be operated to open and/or close access point 105 (e.g., door, gate, etc.) for the user.

However, simply having an authorized credential or simply passing an authorized credential to a reader does not necessarily indicate an intent of the user having the authorized credential to access the secure area or asset. For example, the user may simply be walking past the reader having no intent on accessing the secure area or asset. If the authorized credential is passed from the passing user's credential device to the reader and the secure asset is, for example, unlocked or opened, unauthorized users may undesirably have access to the secure area or asset.

Accordingly, it can be desirable to determine whether a user of an authorized credential appears to have or otherwise appears to exhibit an intent to access the secure area or asset prior to authorizing the credential or prior to unlocking, opening, or otherwise permitting access to the secure asset or area. Evidence of intent can include such things as touching a door handle, gesturing with the key-device, etc. However, these require action or interaction by the user of the credential and can create a less than ideal user experience. The use of UWB localization techniques, however, can provide a more seamless user experience where user intent can be determined or inferred based on credential device location, direction, and/or angle of incidence or arrival. As indicated above, localization techniques of UWB can be very accurate and may provide both range and direction of the credential or key device with respect to the reader. As such, in some cases, both reader 102 and credential device 114 can include an antenna designed or configured for transmitting and/or receiving UWB signals (again, referred to herein for simplicity as a "UWB antenna") such that the reader and credential device can communicate using UWB techniques. Specifically, at least one of antennas 306 of reader 102 can be a UWB antenna. Likewise, reader interface 118 of credential device 114 can also include a UWB antenna.

In addition to location or distance of the credential device to the reader, one desirable aspect of a credential device that can be useful for determining user intent in a PACS involving an access point (e.g., door, gate, turnstile, etc.) controlling access to a secure area, such as secure area 104, can be the credential device's angle of incidence or arrival (AoA) with respect to the reader. In addition to determining the credential device's AoA, it can also be useful to understand or determine whether a user of a credential device is outside the secure area or already inside the secure area. In some cases, a user outside of the secure area in the range of the reader (and also possibly moving toward the reader) may be considered having intent to enter the secure area, whereas a user inside the secure area and in the range of the reader (and also possibly moving toward the reader) can be ignored or otherwise considered as lacking intent since they are already within the secure area.

Figure 5:
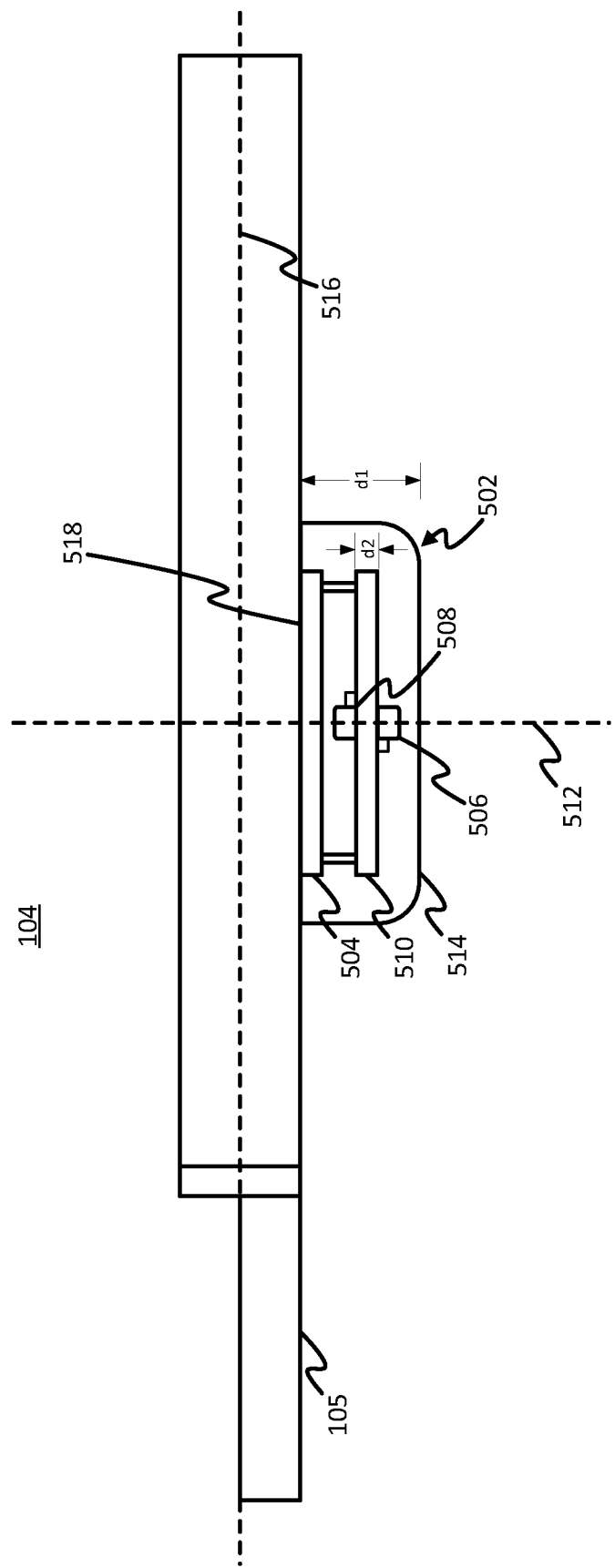
FIG. 5 illustrates a block diagram schematic of an example PACS reader mounted to a wall.

FIG. 5 illustrates a block diagram schematic of an example reader 502 configured for determining an AoA of a credential device and also whether a credential device is outside or inside, or simply outside, secure area 104. Reader 502 can include one or more printed circuit boards (PCBs) 504 or other electrical circuitry (referred to simply as "PCB 504") comprising some or all of the components described with respect to FIG. 3. PCB 504 can also include additional components, as necessary or desirable. As part of the one or more antennas 306 described above, reader 502 can include two UWB antennas 506, 508. The antenna design of UWB antennas 506, 508 can have any suitable known or to-be-discovered shape or design suitable for UWB communication. UWB antennas 506, 508 can be attached to opposite sides of, and electrically connected with, a PCB or other hardware component 510 (referred to simply as "PCB 510"). PCB 510 and/or UWB antennas 506 can be operably and/or electrically coupled with one or more components of PCB 504. Although illustrated as being on a separate PCB, in some cases, antennas 506, 508 can be attached to opposite sides of, and electrically connected with PCB 504.

UWB antennas 506, 508 can be spaced apart along an antenna axis 512 a distance of d2. In some cases, the UWB antennas 506, 508 being spaced apart or arranged along the antenna axis 512 can include the axis passing through a central region or centroid of each of the UWB antennas. In some cases, the UWB antennas 506, 508 being spaced apart or arranged along the antenna axis 512 can include the axis passing through non-central regions of the UWB antennas or a combination of a central region of one UWB antenna and a non-central region of the other UWB antenna.

PCB 510 (or PCB 504 as may be the case) may correspondingly have a thickness of d2. However, in other examples, the distance d2 between UWB antennas 506, 508 could be more than the thickness of PCB 510 (or PCB 504 as may be the case), for example, by using additional spacers or spacing material. In some cases, PCB 510 (or PCB 504 as may be the case) can be sized and/or configured to occupy substantially the entire region or space between UWB antennas 506, 508 or more, as illustrated in the example of FIG. 5. In other cases, PCB 510 (or PCB 504 as may be the case) can be sized and/or configured occupy only a portion of the region or space between UWB antennas 506, 508, such as but not limited to, at least 25%, at least 50%, at least 75%, or at least 90% of the region or space between the UWB antennas. Said another way, PCB 510 (or PCB 504 as may be the case) can be sized and/or configured occupy less than all of the region or space between UWB antennas 506, 508, such as but not limited to, less than 99%, less than 90%, less than 75%, or less than 60% of the region or space between the UWB antennas. In some cases, PCB 510 (or PCB 504 as may be the case) can be sized and/or configured occupy an amount of region or space between UWB antennas 506, 508 as may be determined preferable for a given use or determined to provide a predictable, preferred, or suitable result, such as but not limited to, between about 35% to about 99%, between about 40% to about 95%, between about 50% to about 95%, between about 75% to about 95%, or between about 75% to about 90% of the region or space between the UWB antennas.

In some instances, PCB 510 (or PCB 504 as may be the case), or one or more portions thereof between UWB antennas 506, 508 can include one or more material types, including a substantially homogeneous material disposed substantially consistently between the antennas, a composite material that varies in one or more properties along or perpendicularly to antenna axis 512, or layers of, or a series of, multiple materials, such as a core or core layer with one or more additional layers of the same or different material(s).

Reader 502 includes a housing 514 having depth d1. As may be appreciated, distance d2 can have a direct effect on depth d1 of reader housing 514. That is, generally, the larger distance d2 is, the deeper depth d1 will likely have to be.

Reader 502 can be mounted to a fixed structure, such as wall 516 (or other boundary that can define a secured area) near to or comprising access point 105. Reader 502 can comprise or define a mounting plane 518 configured for mounting the reader flat against wall 516. In some cases, mounting plane 518 can be coplanar or spaced apart from wall 516. Wall 516 may have, at least for some distance, a wall axis 516. UWB antennas 506, 508 can be configured within reader 502 such that antenna axis 512 is generally out of plane (e.g., at a non-zero or non-parallel angle) relative the mounting plane 518 and/or wall axis 516. In some cases, UWB antennas 506, 508 can be configured within reader 502 such that antenna axis 512 is generally perpendicular to mounting plane 518 and/or reader 502 can be mounted to wall 516 such that antenna axis 512 is generally perpendicular to wall axis 516. However, in other cases, as may be desirable, UWB antennas 506, 508 can be aligned within reader 502 and/or reader 502 can be mounted to wall 516 such that antenna axis 512 is arranged at another angle relative mounting plane 518 and/or wall axis 516, such as between a 25° angle to a 155° angle relative the mounting plane or wall axis, between a 45° angle to a 135° angle relative the mounting plane or wall axis, or between a 60° angle to a 120° angle relative the mounting plane or wall axis. Other suitable non-parallel angles can also be used, as desired.

Figure 6:
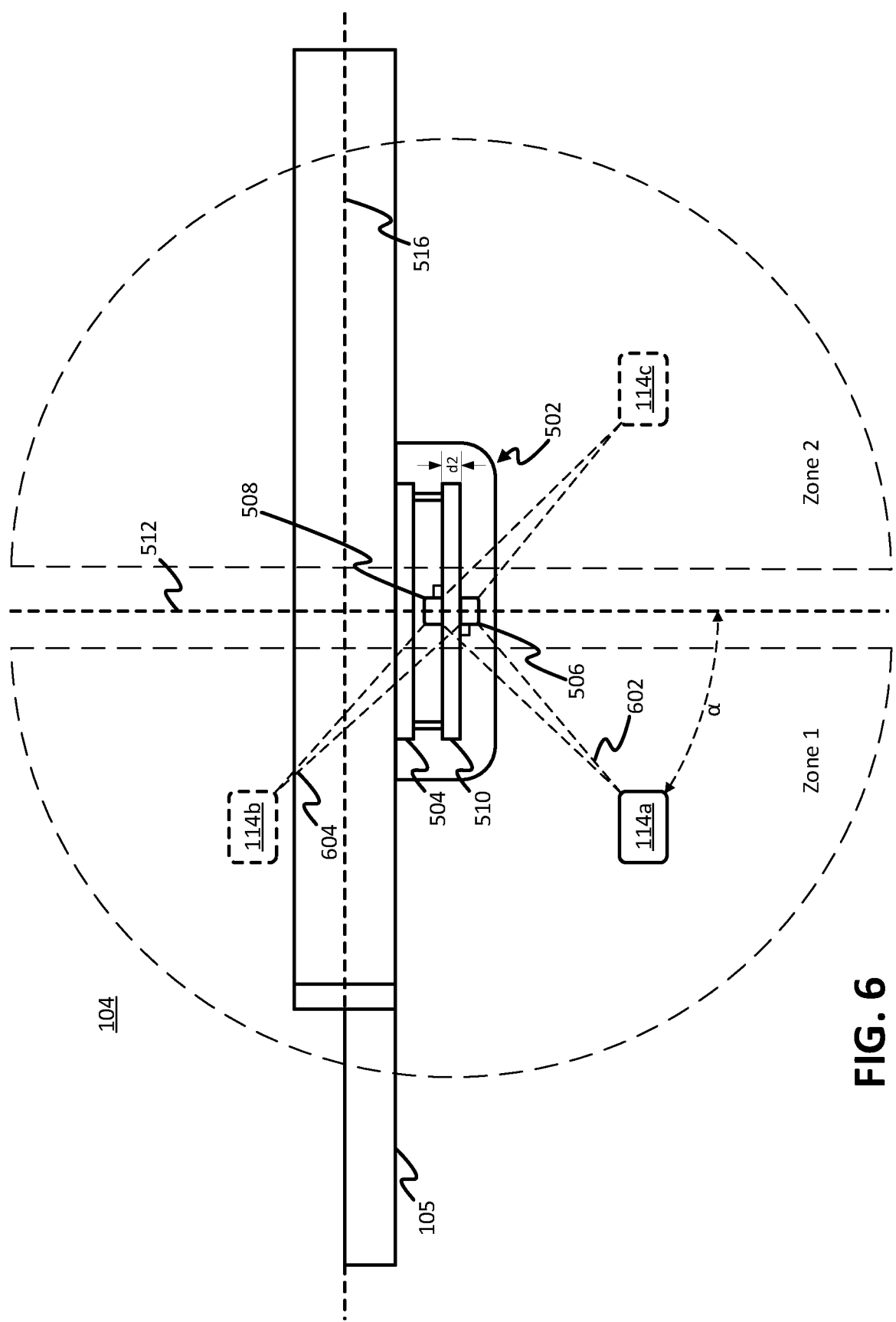
FIG. 6 illustrates additional aspects of the reader of FIG. 5.

With reference to FIG. 6, UWB antennas 506, 508 can be used to determine the AoA of credential device 114. Particularly, a UWB signal or communication packet 602 may be transmitted from credential device 114a on the outside of secure area 104 and received by UWB antennas 506, 508. Based on the phase difference between the signal received at UWB antenna 506 and UWB antenna 508, an angle of incidence or arrival (AoA) α of credential device 114 with respect to antenna axis 512 can be determined. The AoA can be used to determine intent of the user of the credential device. In addition to AoA, due to the configuration of UWB antennas 506, 508, described above, and based on the timing difference between when UWB antenna 506 and UWB antenna 508 receive signal 602, it can be determined whether credential device 114 is outside or inside secure area 104. Specifically, if UWB antenna 506 receives the signal 602 prior to UWB antenna 508, then it can be determined that the credential device, such as credential device 114a, is closer to UWB antenna 506 than UWB antenna 508 and is, thus, on the side of reader 510 that is outside secure area 104. In contrast, a signal or communication packet 604 from credential device 114b will be received by UWB antenna 508 prior to being received by UWB antenna 506. As such, it can be determined that credential device 114b is closer to UWB antenna 508 than UWB antenna 506 and is, thus, on the side of reader 510 that is inside secure area 104. As indicated above, whether a user is outside or inside the secure area can be useful in understanding or determining the user's intent to access the secure area. For example, a user outside of the secure area in the range of the reader (and also possibly moving toward the reader) may be considered having intent to enter the secure area, whereas a user inside the secure area and in the range of the reader (and also possibly moving toward the reader) can be ignored or otherwise considered as lacking intent since they are already within the secure area.

With reference still to FIG. 6, because antenna axis 512 is generally perpendicular (or at some other non-parallel angle) to wall axis 516 (and/or the reader mounting plane 518), in certain instances, a signal from a credential device 114c may produce the same distance, AoA α, and outside/inside determinations as credential device 114a. More generally, credential device distance and AoA determinations made in Zone 2 may generally mirror those in Zone 1. Zone 1 and Zone 2 designations are provided in FIG. 6 solely for ease of discussion and are not intended to define or limit any reader range or functional separation of reader zones. However, due to the configuration of UWB antennas 506, 508, outside/inside determinations continue to distinguish between devices that are outside or inside secure area 104.

That is, despite having the same distance and AoA determinations as credential device 114a, credential device 114c nonetheless produces an accurate determination that it is outside secure area 104. As such, the outside/inside determination remains additionally beneficial, for the reasons already described, in understanding or determining user intent. One or more additional antennas could be added to reader 502, however, in order to distinguish between credential device 114a and 114c, if such additional localization is desired or required. Additionally or alternatively, heuristic algorithms could be used to determine the likelihood that a credential device is credential device 114a or credential device 114c. Additionally or alternatively, a companion reader, beacon device, or other unit can be used in combination with reader 502 in order to provide additional localization information.

A potential consideration of the foregoing configuration of UWB antennas 506, 508, however, is that in order to get a generally sufficient resolution for AoA and/or outside/inside determinations, UWB antennas 506, 508 should be spaced apart along antenna axis 512 a distance d2 that is generally at least as great as half the wavelength (2) of the signal (i.e., $\lambda/2$). Wavelength is the speed (v) of a wave in a medium divided by the frequency (f) of the wave, or $\lambda = v/f$. Assuming the medium that comprises the space between UWB antennas 506, 508 is air or a material with permittivity similar to air, at frequencies desirable for PACS, distance d2 will likely be in the teens of millimeters (mm) or higher. For example, at frequencies between around 6.3 Ghz to 8 Ghz, an air distance d2 would generally fall between around 18 mm to 24 mm. For simplicity of discussion herein, the wavelength of a signal or electromagnetic wave through air or a material with permittivity similar to air will be referred to as "air wavelength" or "$\lambda_A$." As indicated above, distance d2 can have a direct effect on depth d1 of reader housing 514. For example, at such frequencies between around 6.3 Ghz to 8 Ghz, in a reader where antenna axis 512 is generally perpendicular to wall axis 516, depth d1 would be greater than distance d2 and likely be larger than at least 19 or 20 mm. Other reader housings may have a size of less than that, and it may be desirable for future generation readers to have even smaller depths d1, as relatively large reader housings take more real estate on the wall or other mounting surface, can cost more (particularly in material cost) to manufacture, can be more complicated to mount, can be more obtrusive, and are usually not as aesthetically pleasing. While, as noted above, antenna axis 512 can be aligned at some other none parallel angle to wall axis 516, which may, although not necessarily, help reduce depth d1 of reader housing 514, such alignment can increase cost of the reader, increase the complexity of, for example, outside/inside determinations, and decrease the benefit of, for example, outside/inside determinations.

Accordingly, in order to decrease the distance d2 between UWB antennas 506, 508 while retaining sufficient resolution for AoA (and/or outside/inside determinations), PCB 510 (or PCB 504 as may be the case) can comprise of a material or combination of materials having a permittivity (or permittivities) selected to, or a material or combination of materials otherwise selected, designed, or configured to, slow down, and decrease the wavelength of, the electromagnetic waves or field passing therethrough. For example, PCB 510 (or PCB 504 as may be the case) may comprise a thickness d2 of a material or combination of materials having a permittivity (or permittivities) selected to, or a material or combination of materials otherwise selected, designed, or configured to, slow down, and decrease the wavelength of, the electromagnetic waves enough such that, while thickness d2 is less than $\lambda_A/2$ (e.g., if the electromagnetic waves were passing through air or a material with permittivity similar to air), the PCB thickness nonetheless provides an effective or functional separation distance of UWB antennas 506, 508 of at least $\lambda_A/2$, or simulates, mimics, resembles, represents, corresponds to, or is generally equivalent to a separation distance of the UWB antennas of at least $\lambda_A/2$. Said a different way, for a given AoA resolution that can be achieved between UWB antennas 506, 508 spaced apart from each other a separation distance SD by air or a material with permittivity similar to air, PCB 510 (or PCB 504 as may be the case) may comprise a thickness d2 of a material or combination of materials having a permittivity (or permittivities) selected to, or a material or combination of materials otherwise selected, designed, or configured to, slow down, and decrease the wavelength of, the electromagnetic waves enough such that thickness d2 is less than separation distance SD and at least substantially the same AoA resolution can be obtained or be maintained. The material or combination of materials selected, designed, or configured to slow down the electromagnetic waves or field can dictate how much thickness d2 can be reduced from $\lambda_A/2$. In some cases, thickness d2 can be reduced from $\lambda_A/2$ by 50% or more. For example, PCB 510 (or PCB 504 as may be the case) can comprise FR4 or other dielectric PCB material. FR4, for example, may slow down the electromagnetic waves by a little more than a factor of two, and as such, a resolution of AoA at an air separation distance of around 17 mm, for example, between UWB antennas 506, 508 can similarly be obtained at a distance d2 between UWB antennas 506, 508 on a FR4 PCB of less than 8 mm, and closer to 6 mm.

Figure 7:
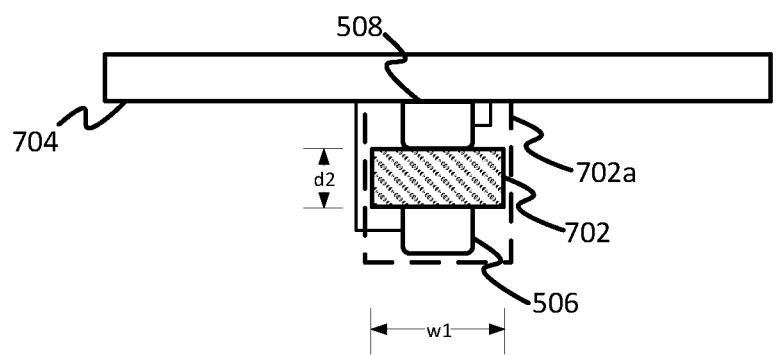
FIG. 7 illustrates a block diagram schematic of a configuration of UWB antennas and a material having a permittivity selected to, or a material otherwise selected, designed, or configured to, slow down the electromagnetic waves or field passing therethrough disposed between the UWB antennas.

FIG. 7 illustrates a block diagram schematic of another possible configuration of UWB antennas 506, 508 and a material or combination of materials 702 having a permittivity (or permittivities) selected to, or a material or combination of materials otherwise selected, designed, or configured to, slow down, and decrease the wavelength of, the electromagnetic waves or field passing therethrough. In the configuration of FIG. 7, UWB antennas 506, 508 are not on opposite sides of a PCB, but are mounted on the same side of a PCB or other hardware component 704 (referred to simply as "PCB 704"). Specifically, UWB antenna 508 can be attached to PCB 704, a thickness d2 of material(s) 702 can be placed, stacked, and/or affixed on UWB antenna 508, and UWB antenna 506 can be placed, stacked, and/or affixed on material(s) 702. Width w1 of material 702 can be any suitable width, as desired or required to obtain the desired effect. Additionally, although illustrated as a layer or thickness of material, material(s) 702 can take any suitable shape or form, including any regular shape (such as a cube, rectangular prism, triangular prism, disk, etc.) or irregular shape. Moreover, material(s) 702 can have a constant thickness d2 along width w1, or can have a thickness that is variable along its width w1 or any other axis. Still further, material(s) 702 can be configured to surround or partially surround UWB antenna 506 and/or UWB antenna 508 (e.g., as illustrated in one example as dashed line 702a in FIG. 7), and is not limited to a layer of constant thickness positioned strictly between UWB antennas 506, 508.

Moreover, in some cases, material(s) 702 can be sized and/or configured to occupy substantially the entire region or space between UWB antennas 506, 508 or more, as illustrated in the example of FIG. 7. In other cases, material(s) 702 can be sized and/or configured occupy only a portion of the region or space between UWB antennas 506, 508, such as but not limited to, at least 25%, at least 50%, at least 75%, or at least 90% of the region or space between the UWB antennas. Said another way, material(s) 702 can be sized and/or configured occupy less than all of the region or space between UWB antennas 506, 508, such as but not limited to, less than 99%, less than 90%, less than 75%, or less than 60% of the region or space between the UWB antennas. In some cases, material(s) 702 can be sized and/or configured occupy an amount of region or space between UWB antennas 506, 508 as may be determined preferable for a given use or determined to provide a predictable, preferred, or suitable result, such as but not limited to, between about 35% to about 99%, between about 40% to about 95%, between about 50% to about 95%, between about 75% to about 95%, or between about 75% to about 90% of the region or space between the UWB antennas.

In some instances, material(s) 702, or one or more portions thereof between UWB antennas 506, 508 can include one or more material types, including a substantially homogeneous material disposed substantially consistently between the antennas, a composite material that varies in one or more properties along or perpendicularly to antenna axis 512, or layers of, or a series of, multiple materials, such as a core or base, or a core or base layer, with one or more additional layers of the same or different material(s).

In some cases, a combination of the example configurations illustrated in FIGS. 5-7 can be utilized. Specifically, both a PCB and (one or more) material(s) 702 (which could include another PCB or PCB material) may be positioned at least partially between UWB antennas 506, 508.

Figure 8:
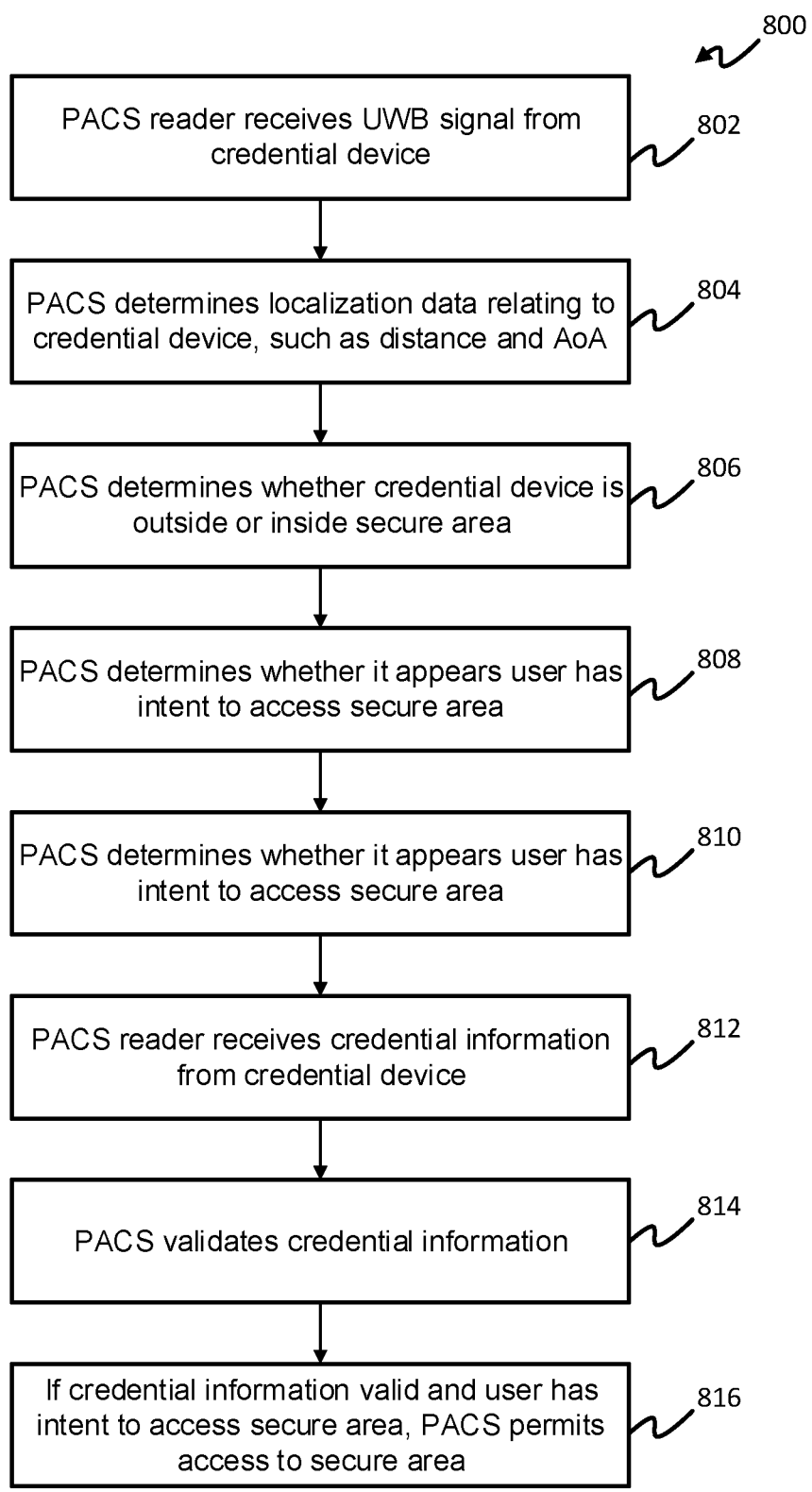
FIG. 8 is a flow diagram of a method, in a PACS comprising an access point, such as a door, gate, turnstile or the like controlling or permitting authorized access to a secure area, for determining a user's intent to access the secure area and permitting/denying access thereto.

FIG. 8 illustrates a method 800, in a PACS comprising an access point, such as a door, gate, turnstile or the like controlling or permitting authorized access to a secure area, for determining a user's intent to access the secure area and permitting/denying access thereto. At step 802, a reader of the PACS may receive a UWB signal from a credential device having a UWB antenna, such as described herein. The reader can have any of the example configurations described above. Accordingly, at step 802, the reader receives the signal from the credential at (at least) two UWB antennas. At step 804, the reader and/or a controller and/or a host server of the PACS may determine localization data relating to the credential device, such as distance and AoA. Additionally, at step 806, based on the configuration of the (at least) two UWB antennas and the time of receipt of the signal at each of the (at least) two UWB antennas, the reader, controller, and/or a host server of the PACS can determine whether the credential device is outside or inside the secure area. At step 808, based on one or more of the localization data and outside/inside determination, the reader, controller, and/or a host server of the PACS can determine whether it appears the user has or is exhibiting an intent to access the secure area. At step 812, which can alternatively occur prior to or simultaneously with step 802 or at any other time between steps 802 and 812 in the flow chart of FIG. 8, the reader of the PACS may receive a credential or credential information from the credential device. At step 814, which can occur any time after the reader receives the credential information, the reader, controller, and/or a host server of the PACS may validate the credential information. In one example, the reader, controller, and/or a host server of the PACS can wait to validate the credential information until after it has been determined that the user has or is exhibiting an intent to access the secure area. In other cases, the reader, controller, and/or a host server of the PACS can validate the credential information prior to or simultaneously with determining that the user has or is exhibiting an intent to access the secure area. At step 814, if the credential information is valid and it has been determined that the user has or is exhibiting an intent to access the secure area, the reader, controller, and/or a host server of the PACS may permit access to the secure area by the user of the credential device.

While described with respect to PACS, the configurations of UWB antennas 506, 508 in any of the foregoing embodiments and methods of using the same in a manner similar to, or different than, the methods described with respect to FIG. 8 can also be used in systems other than PACS. Additionally or alternatively, while described with particular respect to UWB antennas 506, 508, other types of suitable antennas, time-of-flight (TOF) capable sensors, or the like can be used in addition to or as an alternative to UWB antenna 506 and/or UWB antenna 508 in any of the foregoing embodiments and methods of using the same, as may be desired.

Additional Notes

The above detailed description includes references to the accompanying drawings, which form a part of the detailed description. The drawings show, by way of illustration, specific embodiments that can be practiced. These embodiments may also be referred to herein as "examples." Such embodiments or examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. That is, the above-described embodiments or examples or one or more aspects, features, or elements thereof can be used in combination with each other.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "first," "second," and "third," etc. are used merely as labels, and are not intended to impose numerical requirements on their objects.

Additionally, unless otherwise specified, as used herein, the phrases "at least one of [X] and [Y]" or "at least one of [X] or [Y]," where [X] and [Y] are different components that may be included in an embodiment of the present disclosure, means that the embodiment could include component [X] without component [Y], the embodiment could include component [Y] without component [X], or the embodiment could include both components [X] and [Y]. Similarly, when used with respect to three or more components, such as "at least one of [X], [Y], and [Z]" or "at least one of [X], [Y], or [Z]," the phrases mean that the embodiment could include any one of the three or more components, any combination or sub-combination of any of the components, or all of the components.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A method for determining user intent of a user to access a secure area secured using a secure access point, the method comprising:

receiving an ultra-wide band (UWB) signal from a credential device at each of a first and second UWB antenna, wherein a distance between the first and second UWB antennas is less than a half wavelength of the UWB signal through air ($\lambda_A/2$), and wherein a material disposed between the first and second UWB antennas is configured to slow down electromagnetic waves passing therethrough such that an effective separation distance of the first and second UWB antennas is at least a half wavelength of the UWB signal through air ($\lambda_A/2$);

determining localization data relating to the credential device based on the UWB signal;

based on a time of receipt of the UWB signal at each of the first and second UWB antennas, determining whether the credential device is outside or inside the secure area; and based on the localization data and the determination of whether the credential device is outside or inside the secure area, determining whether the user is exhibiting an intent to access the secure area.

2. The method of claim 1, further comprising:

receiving credential information from the credential device;

validating the credential information; and if the credential information is valid and it has been determined that the user is exhibiting an intent to access the secure area, permitting access to the secure area by the user of the credential device.

3. The method of claim 2, wherein the step of validating the credential information is completed after determining that the user is exhibiting an intent to access the secure area.

4. The method of claim 2, wherein the step of validating the credential information is completed prior to or simultaneous with determining that the user is exhibiting an intent to access the secure area.

5. The method of claim 1, wherein the first and second UWB antennas are mounted on the same side of a printed circuit board (PCB).

6. The method of claim 1, wherein the material comprises a printed circuit board (PCB).

7. The method of claim 1, wherein the material comprises a plurality of materials.

8. The method of claim 1, wherein the material comprises a composite of material that varies in one or more properties along an axis between the first and second UWB antennas.

9. The method of claim 1, wherein a thickness of the material defines the distance between the first and second UWB antennas.

10. The method of claim 1, wherein a reader is associated with the secure access point, the reader comprising the first and second UWB antennas, and wherein the first and second UWB antennas are aligned along an axis that is generally perpendicular to a surface to which the reader is mounted.

11. The method of claim 10, wherein the axis passes through a centroid of at least one of the first and second UWB antennas.

12. The method of claim 1, wherein a reader is associated with the secure access point, the reader comprising the first and second UWB antennas, and wherein the first and second UWB antennas are aligned along an axis that is at an angle of between 25° and 155° relative to a surface to which the reader is mounted.

13. The method of claim 12, wherein the axis passes through a centroid of at least one of the first and second UWB antennas.

14. The method of claim 13, wherein the axis passes through a centroid of each of the first and second UWB antennas.

15. The method of claim 1, further comprising receiving the UWB signal from the credential device at a third UWB antenna.

16. The method of claim 15, wherein determining whether the credential device is outside or inside the secure area based on the time of receipt of the UWB signal comprises determining whether the credential device is outside or inside the secure area based on the time of receipt of the UWB signal at each of the first, second, and third UWB antennas.

17. A reader associated with a secure area and comprising:
first and second ultra-wide band (UWB) antennas; and
memory storing instructions, that when executed by one or more processors of the reader, cause the one or more processors to:
  determine localization data relating to a credential device based on a UWB signal received from the credential device at each of the first and second UWB antennas, wherein a distance between the first and second UWB antennas is less than a half wavelength of the UWB signal through air ($\lambda_A/2$), and wherein a material disposed between the first and second UWB antennas is configured to slow down electromagnetic waves passing therethrough such that an effective separation distance of the first and second UWB antennas is at least a half wavelength of the UWB signal through air ($\lambda_A/2$);
  based on a time of receipt of the UWB signal at each of the first and second UWB antennas, determine whether the credential device is outside or inside the secure area; and
  based on the localization data and the determination of whether the credential device is outside or inside the secure area, determine whether a user of the credential device is exhibiting an intent to access the secure area.

18. A non-transitory computer readable storage medium comprising instructions, that when executed by one or more processors, causes the one or more processors to:
  determine localization data relating to a credential device based on a UWB signal received from the credential device at each of first and second UWB antennas, wherein a distance between the first and second UWB antennas is less than a half wavelength of the UWB signal through air ($\lambda_A/2$), and wherein a material disposed between the first and second UWB antennas is configured to slow down electromagnetic waves passing therethrough such that an effective separation distance of the first and second UWB antennas is at least a half wavelength of the UWB signal through air ($\lambda_A/2$);
  based on a time of receipt of the UWB signal at each of the first and second UWB antennas, determine whether the credential device is outside or inside a secure area associated with the first and second UWB antennas; and
  based on the localization data and the determination of whether the credential device is outside or inside the secure area, determine whether a user of the credential device is exhibiting an intent to access the secure area.

* * * * *